Figure 1:
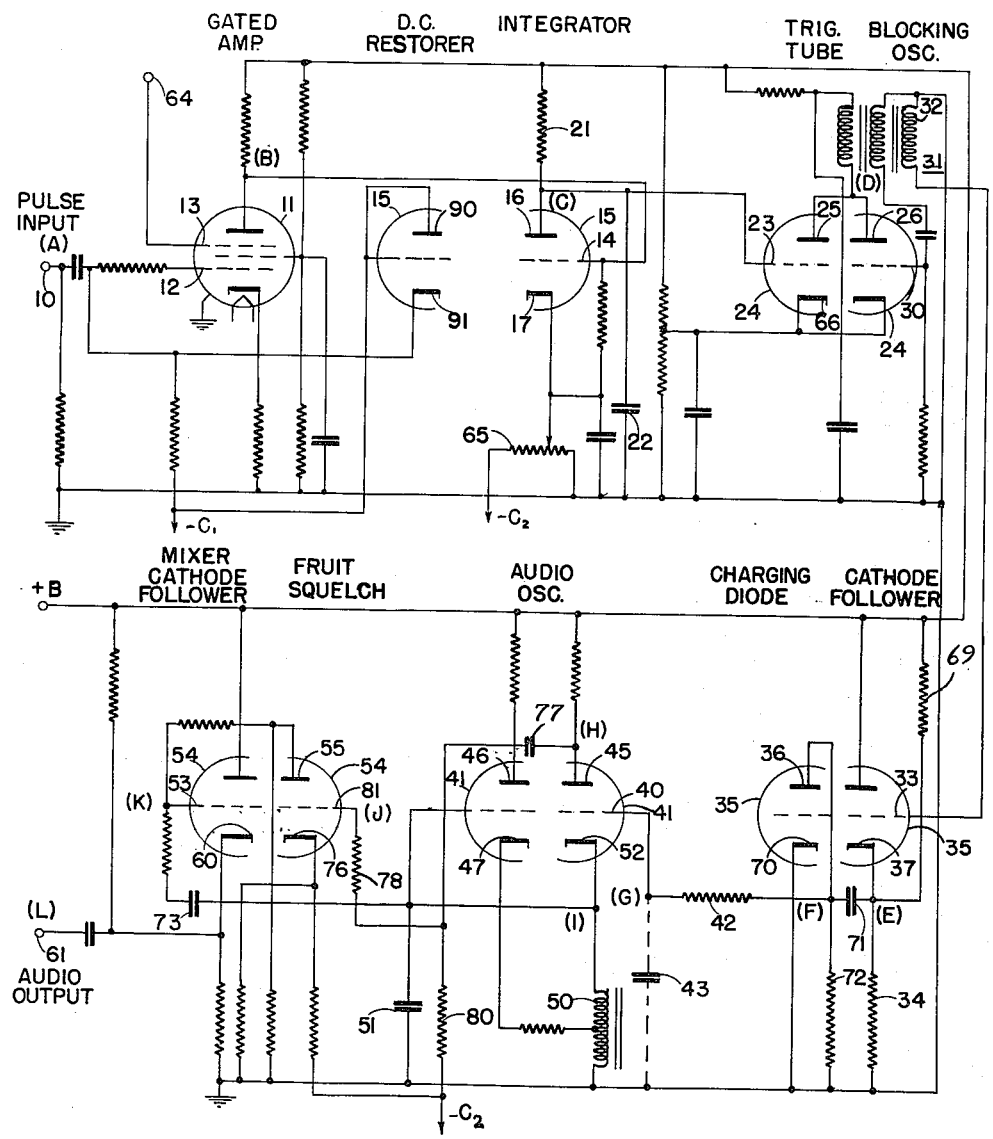

Sept. 22, 1953  C. W. JOHNSTONE ET AL  2,653,234
RADIO IDENTIFICATION SYSTEM

Filed Oct. 4, 1945                                3 Sheets-Sheet 1

Inventors
CHARLES W. JOHNSTONE
WALTER N. DEAN
LEONARD MAUTNER

By M. O. Hayes
Attorney

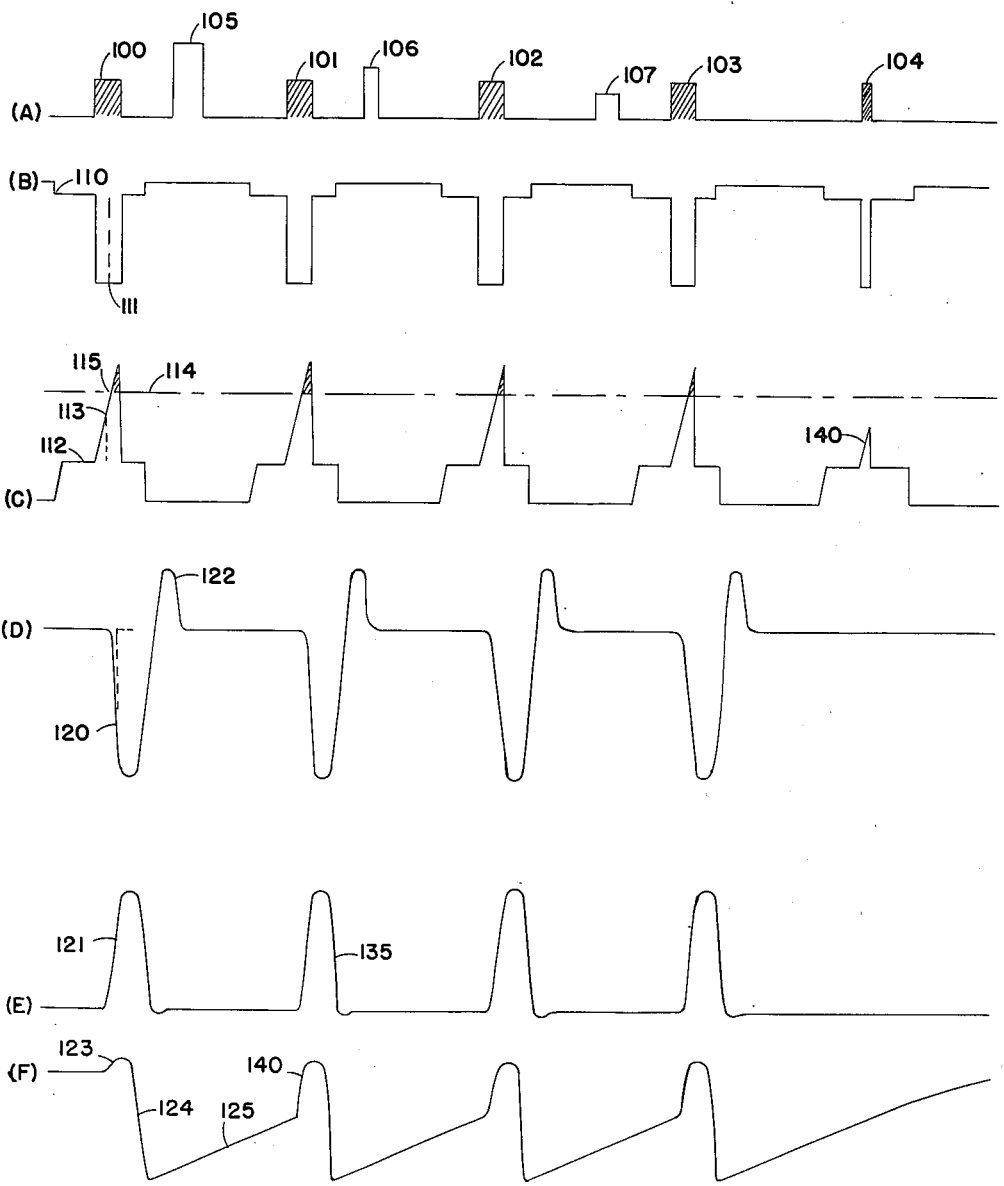

Sept. 22, 1953   C. W. JOHNSTONE ET AL   2,653,234
RADIO IDENTIFICATION SYSTEM

Filed Oct. 4, 1945   3 Sheets-Sheet 3

Inventors
CHARLES W. JOHNSTONE
WALTER N. DEAN
LEONARD MAUTNER

Attorney

Patented Sept. 22, 1953

2,653,234

UNITED STATES PATENT OFFICE 2,653,234

RADIO IDENTIFICATION SYSTEM

Charles W. Johnstone and Walter N. Dean, Washington, D. C., and Leonard Mautner, Arlington, Va., assignors, by direct and mesne assignments, to the United States of America as represented by the Secretary of the Navy Application October 4, 1945, Serial No. 620,348

4 Claims. (Cl. 250—27)

1

This invention relates to a circuit and method for producing a predetermined continuous output signal from a series of input signals having predetermined characteristics.

More particularly this invention relates to a circuit and method for discriminating in favor of discrete energy pulses having predetermined characteristics and deriving from a series of such pulses a predetermined output signal which endures continuously substantially for the duration of the series of discrete pulses.

In radiant energy location and identification systems, it is known to transmit pulses of energy and use the information derived from echoes to determine the range and direction of targets from which the energy pulses are reflected. It is also known to install in friendly craft or at friendly stations, a receiver-transmitter which responds to each received energy pulse with a transmitted pulse of predetermined characteristics whereby the interrogated craft or station may be identified.

Under certain conditions it is desirable that the transponding craft, in addition to identifying itself as friendly, be able to communicate with the interrogating station. This invention will be described in connection with an embodiment wherein the interrogating station includes a means for distinguishing between two types of answering pulses, as determined by the interrogated craft.

In the circuit of this invention, answering pulses from an interrogated craft are applied at a predetermined rate to the input of the circuit. The answering pulses are of two types, narrow and wide. The circuit of this invention discriminates in favor of the wide pulses; utilizes a series of wide pulses to produce a continuing gate enduring for the duration of the series of wide pulses; and employs the gate to control an audio generator producing a tone of predetermined frequency and of duration dependent upon the duration of each incoming series of wide pulses.

It will be understood that at the receiver-transmitter or transpondor of the interrogated craft, a control means will be provided whereby the response may consist, selectively, of either a series of narrow pulses, which will produce only silence in the audio circuit at the receiving station, or a series of wide pulses, which will produce either a dot or a dash depending upon the duration of the series of wide pulses.

Figure 2:
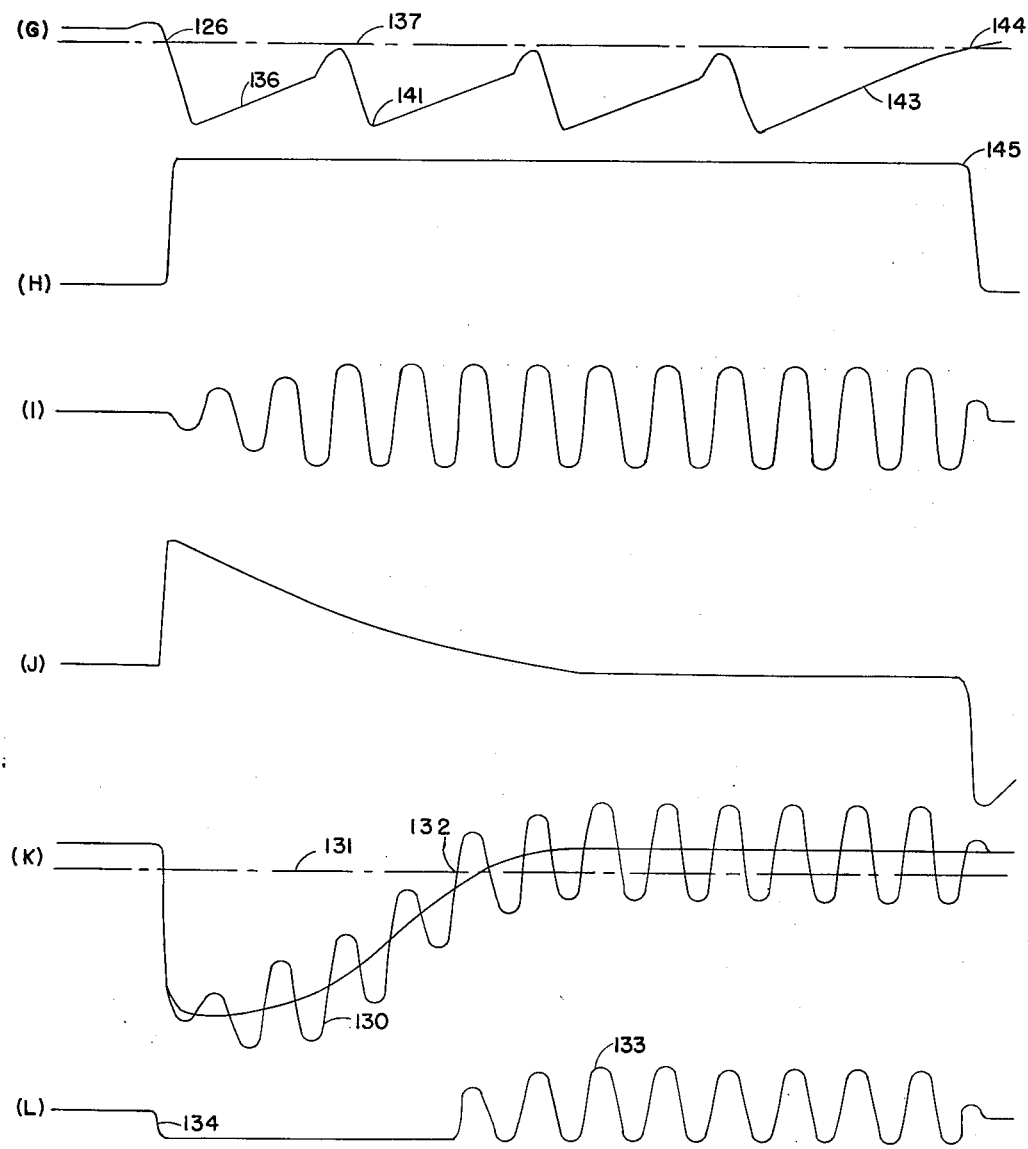

This invention will now be particularly described with reference to the accompanying drawings in which, Fig. 1 illustrates a circuit embodying the principles of this invention; and Fig. 2 illustrates certain wave forms appearing throughout the circuit of Fig. 1.

Referring to Fig. 1, the circuit is shown consisting of input terminal 10, to which pulses from the receiver of the interrogator-responsor are

2 applied. The pulses are amplified in tube 11 by application to grid 12 thereof. To suppressor 13 of tube 11 is applied a controlling "strobe," which will be more fully explained hereinafter. Output from amplifier 11 is applied to grid 14 of tube 15 having anode 16 and cathode 17. The output at anode 16, consisting of a rising saw tooth produced by the RC action of resistor 21 and capacitor 22, is applied to grid 23 of tube 24. The two anodes 25 and 26 of tube 24 are connected together, as are the cathodes. Grid 30 of tube 24 cooperates with anode 26, through the coupling of pulse transformer 31, to produce a large output pulse in response to a relatively small triggering pulse. This will be recognized as the known operation of a non-free-running blocking oscillator. Output from the blocking oscillator is taken from winding 32 of pulse transformer 31 and is applied to grid 33 of a cathode follower having resistor 34 in the cathode circuit thereof. The other half of tube 35 is used as a charging diode, producing a rising saw tooth on anode 36 thereof. Output from anode 36 is applied to grid 40 of tube 41 through the filtering action of resistor 42 and stray capacitance 43. A continuing gate signal is formed on anode 45 of tube 41, while a sustained audio frequency signal is generated by the action of the other half of tube 41 comprising anode 46 and cathode 47 acting as a modified Hartley oscillator. The frequency of oscillation is determined by inductor 50 and capacitor 51. This audio signal, appearing on cathode 52 of tube 41, is applied to grid 53 of tube 54. The continuing gate appearing on anode 45 of tube 41 is applied, after amplification and inversion in the other half of tube 54 having anode 55, to grid 53 of tube 54. Output appearing on cathode 60 of tube 54 is applied thru a coupling capacitor to output terminal 61.

The operation of the circuit of Fig. 1 will best be understood by reference to Fig. 2, illustrating wave forms throughout the circuit of Fig. 1. Reference letters (A) thru (L) in Fig. 2 indicate the voltages at the correspondingly marked points in Fig. 1.

Referring now to the drawings, Fig. 2(A) illustrates a signal such as might be applied to terminal 10 of the circuit of Fig. 1. Shaded pulses 100, 101, 102, 103, and 104 constitute the regularly spaced pulses returning from an interrogated transpondor. Pulses 105, 106 and 107 are random pulses, which will not be translated by the circuit because of the action of a range "strobe" to be described hereinafter. It will be noted that pulses 100 thru 103, inclusive, are wire, whereas pulse 104 is narrow. As will be described hereinafter, the series of consecutive wide pulses will produce an output signal which will cease with the cessation of the wide pulse series and the appearance of the narrow pulse series represented by 104.

On the anode of tube 11 will appear, amplified, the pulses 100 through 104 inclusive, as shown in Fig. 2(B), while the intermediate random pulses 105, 106, and 107 will be rejected. This rejection is due to the action of a "strobe," consisting of a gating signal applied to terminal 64, connected to suppressor 13 of tube 11. Normally the suppressor will be held at a potential sufficiently low to cut off all transmission through tube 11. However, a positive gating pulse, called a strobe, is placed on the suppressor at each range of time corresponding to the distance range in which it is desired to receive signals. In this manner, signals coming from undesired ranges, as well as random pulses, will be blocked. The strobe gate applied to suppressor 13 of tube 11 will appear on the anode thereof as a negative step or pedestal 110 (Fig. 2(B)). Superimposed on this negative pedestal will be the amplified input pulse 100, appearing as a negative pulse 111. The other pulses of the system 101, 102, 103, and 104, falling within a strobe gate, will likewise be amplified as shown in Fig. 2(B); whereas pulses 105, 106 and 107, lying outside the desired range, will not be translated.

Pulses 111, on the anode of tube 11, will be applied to grid 14 of normally conducting tube 15, causing it to cease conduction. Cessation of conduction in tube 15 will start a rising saw tooth wave on its anode 16 through the action of RC circuit 21—22. The level from which saw tooth 113 starts to rise, i. e., the level 112 in Fig. 2(C), is determined by the bias on cathode 17 of tube 15, which is in turn determined by the setting of potentiometer 65. Voltage appearing on anode 16 is applied directly to grid 23 of trigger tube 24, cathode 66 of which is biased below the grid cut off point. Therefore, until the rising saw tooth 113 of Fig. 2(C) reaches a level 114, determined by the bias on cathode 66 and by the level of pedestal 112, no signal will appear on anode 25.

When rising saw tooth 113 has reached point 115, equal to the cut off level 114, a negative pulse will start to appear on anodes 25 and 26 of tube 24, as shown at 120 in Fig. 2(D). This pulse will be applied positively through winding 32 of transformer 31 to grid 33 of cathode follower 35. A positive pulse 121, corresponding to pulse 120, will appear on cathode 37 of tube 35. The overswing 122 associated with main pulse 120 will be eliminated by the action of grid 33, biased to cut off with respect to cathode 37 by the voltage divider action of resistors 34 and 69.

Pulse 121, appearing on cathode 37 of tube 35, is applied through capacitor 71 to the charging diode having anode 36 and cathode 70. The positive excursion of pulse 121 will be largely damped by the diode action which ties point (F) to ground for positive excursions. Therefore, the signal at (F) will swing only slightly positive as shown at 123 in Fig. 2(F). The negative excursion terminating pulse 121 will be faithfully reproduced at 124 by virtue of the long time constant represented by capacitor 71 and resistor 72. Upon termination of pulse 121, point (F) will be left at a potential well below ground and will return exponentially toward ground along line 125 in Fig. 2(F).

The slightly positive excursion 123 will be filter damped by the action of resistor 42 and distributed capacitance 43, so that at 126 (Fig. 2(G)) grid 40 of tube 41 will be pulled well below the cut off level 137, and current will cease to flow between cathode 52 and anode 45. Cut off voltage on grid 40 produces two effects, shown respectively, in Fig. 2(H), representing voltage on anode 45, and in Fig. 2(I) representing voltage at cathode 52.

Considering first the effect at cathode 52, blocking of current flow removes the damping effect from LC circuit 50—51, permitting the other half of tube 41, containing anode 46 and cathode 47, to operate as a modified Hartley audio oscillator, with inductor 50 and capacitor 51 being the frequency determining elements. The audio frequency signal appearing at (I) is applied through capacitor 73 to grid 53 of tube 54.

Normally tube 54 would translate the audio signal of Fig. 2(I) to its cathode 60, where it would appear on output terminal 61. To improve the operation of the circuit, however, there is included a means for eliminating unlocked responses, called "fruit" in the art. Fruit responses of the wide pulse character, similar to pulse 100 in Fig. 2(A), appearing within strobes 110 of Fig. 2(B), would not be synchronized with the challenging station equipment, and only a few consecutive fruit pulses would appear within strobes 110. To avoid confusion which might be produced by the spurious, although short, audio signal resulting, means are provided for requiring that the series of pulses, 100 through 103, endure at least for a predetermined time before an audio output signal will be derived from the circuit.

This desensitizing, or "fruit squelch," operation is performed by tube 54, having anode 55 and cathode 76. The fruit squelch operation consists of differentiating the long gating pulse (Fig. 2(H)), produced on anode 45 of tube 41, in RC circuit 80—77 to produce the signal of Fig. 2(J). The waveform of Fig. 2(J) is then applied to grid 81 of tube 54, driving it beyond saturation, and producing at anode 55 the negative pulse shown in Fig. 2(K), enduring for the first part of the gating signal of Fig. 2(H). Superimposed on this signal is the audio signal 130 derived at (I). In this manner grid 53 is pulled well below cut off, so that the first portion of the audio frequency signal 139 (Fig. 2(K)) occurs well below grid cut off, represented by line 131.

Accordingly, it is not until point 132 on the audio signal has been reached, that any signal appears on cathode 60 of tube 54. From this point on, the audio signal rapidly rises to its steady state biased value and appears as an output dot or dash, represented by 133 of Fig. 2(L). In order to minimize the click produced by the negative excursion 134 at the output terminals, the operating bias is not made sufficient to maintain the audio signal completely above the cut off line 131. This distorts, to a certain extent, the audio output 133, but it will be understood that, if desired, a pure tone may be obtained simply by raising the operating bias of grid 53 of tube 54.

By the time the next pulse 101 has been decoded to produce pulse 135 on cathode 37 of tube 35, as shown in Fig. 2(E), the rising saw tooth 136 of Fig. 2(G) has risen closer to the tube conduction and cut off line 137. With the appearance of pulse 135, the voltage at (G) will rise slightly by virtue of the positive excursion 140 at (F) and then will be pulled down sharply to point 141. It will again start to rise toward ground potential, but it will be noted that at no time has the voltage at (G) risen above the cut off line 137 of grid 40. Thus the continuing gate on anode 45 and the audio signal on cathode 52 will be unaffected, as shown in Fig. 2(H) and Fig. 2(I), respectively. Each succeeding wide pulse 102 and 103 appearing within the strobes will pull down the potential at point (G) in time to avoid having grid 40 rise above its cut off potential, thereby continuing the signals at (H) and (I).

Pulse 103 represents the last pulse appearing in the communication chain and is followed by narrow pulse 104, which, while part of the interrogation and identification system, and therefore falling with a strobe signal, does not have the necessary width to actuate the communication circuit described herein. Pulse 104 does not endure long enough to allow the rising saw tooth 140 to reach the firing voltage 114 of trigger grid 23. Therefore, blocking oscillator 24 will not be triggered, and there will be no pulse translated to pull down the rising wave form 143 of Fig. 2(G). When 143 reaches conduction potential 137 at point 144, the anode cathode circuit 45—52 will abruptly conduct, terminating the gate of Fig. 2(H) at 145 and simultaneously stopping operation of the audio oscillator portion of tube 41, so that the audio signal of Fig. 2(I) ceases. At this point the audio output appearing at (L) also stops.

It will be noted that the other half of tube 15, having anode 90 and cathode 91, has been used as a D. C. restorer for control grid 12 of tube 11. The function of this tube is to prevent the D. C. bias on grid 12 from rising above the value $-C_1$ shown. This phenomenon might occur with high repetition rate input pulses, which would raise the average value of the voltage appearing on grid 12 thereby increasing in effect the D. C. bias. The D. C. restorer prohibits such a rise in D. C. grid bias.

From the above description it will be seen that there have been described a method and circuit for producing a predetermined audio output signal in response to a series of pulses, each pulse being of duration greater than a predetermined minimum. Further it will be seen that means have been provided for desensitizing the output portion of the circuit for a predetermined time after the initiation of the series of pulses in order to prevent translation of spurious signals which might meet the coding requirements of the input portion of the circuit.

In this manner a pulse system using regularly spaced pulses of energy may have superimposed upon it an aditional commuication function without in any way affecting the fundamental operation of the basic pulse system.

Although we have shown and described certain specific embodiments of the invention, we are fully aware of the many modifications possible thereof. This invention is not to be restricted except insofar as is necessitated by prior art and the spirit of the appended claims.

What is claimed is:

1. A circuit for producing a predetermined output signal in response to a series of input pulse signals of predetermined duration, comprising: a sawtooth wave generator effective to produce during the duration of an input signal a wave form of changing amplitude, means responsive to a series of output pulses from said sawtooth generator means to produce a control signal of a constant amplitude having a duration equal to the time interval over which said series of output pulses from said generator exists, a signal generator means, means connecting the output of said sawtooth generator means to said signal generator means to produce an output signal, and a squelch circuit connecting said constant amplitude pulse to said signal generator means effective a predetermined time after initiation of said constant amplitude pulse to commence translation of output signals from said signal generator.

2. A circuit for producing a predetermined output signal in response to a series of input pulse signals of predetermined duration comprising a saw tooth wave generator effective to produce, during the duration of an input signal, a wave form of changing amplitude, a threshold clipper means fed by said generator and effective when said wave form has reached a predetermined amplitude to produce an output pulse, an integrator circuit responsive to a series of said output pulses to produce a gating pulse having a duration equal to the interval over which output pulses from said threshold clipper means exist and signal generator means operative during application of said gating pulse to deliver an output signal.

3. A circuit for producing a predetermined output signal in response to a series of input pulse signals of predetermined duration comprising a saw tooth wave generator effective to deliver, during the duration of an input signal, a wave form of changing amplitude, amplitude sensitive means fed by said generator and effective when said wave form has reached a predetermined amplitude to produce an output pulse, a tube responsive to a series of said output pulses to produce a continuous gating pulse, an output signal generator operative during application thereto of said gating pulse to produce an output signal, and output signal translation means effective a predetermined time after initiation of said gating pulse to commence translation of output signals.

4. A circuit for producing a predetermined output signal in response to a series of input signals of predetermined duration, comprising a pulse duration discrimination circuit designed to pass pulses having a duration at least equal to said predetermined duration, means responsive to a series of output pulses from said discrimination circuit to produce a control signal of a constant amplitude having a duration equal to the time interval over which said series of output pulses from said discriminator circuit exists, a signal generator means, means connecting the output of said discriminator circuit to said signal generator means to produce an output signal, and a squelch circuit connecting said constant amplitude pulse to said signal generator means effective a predetermined time after initiation of said constant amplitude pulse to commence translation of output signals from said signal generator.

CHARLES W. JOHNSTONE.
WALTER N. DEAN.
LEONARD MAUTNER.

References Cited in the file of this patent

UNITED STATES PATENTS

| Number | Name | Date |
|---|---|---|
| 2,199,202 | Hermann | Apr. 30, 1940 |
| 2,211,942 | White | Aug. 20, 1940 |
| 2,359,447 | Seeley | Oct. 3, 1944 |
| 2,444,426 | Busignies | July 6, 1948 |
| 2,489,297 | Labin et al. | Nov. 29, 1949 |
| 2,493,648 | Watton et al. | Jan. 3, 1950 |